US009025816B2

(12) United States Patent
Naito et al.

(10) Patent No.: US 9,025,816 B2
(45) Date of Patent: May 5, 2015

(54) IMAGE PROCESSING APPARATUS AND METHOD FOR OBJECT RECOGNITION

(75) Inventors: Hidehiro Naito, Shizuoka-ken (JP);
Masato Watabe, Shizuoka-ken (JP);
Masahide Ogawa, Shizuoka-ken (JP);
Shinji Nakatake, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 314 days.

(21) Appl. No.: 13/603,673

(22) Filed: Sep. 5, 2012

(65) Prior Publication Data

US 2013/0058530 A1    Mar. 7, 2013

(30) Foreign Application Priority Data

Sep. 6, 2011    (JP) .................... 2011-194055

(51) Int. Cl.
*G06K 9/00*    (2006.01)
*G06K 9/46*    (2006.01)

(52) U.S. Cl.
CPC .......... *G06K 9/00208* (2013.01); *G06K 9/4652* (2013.01)

(58) Field of Classification Search
CPC ...................... G06K 9/4652; G06K 9/00208
USPC ........................................................ 382/103
See application file for complete search history.

(56) References Cited

U.S. PATENT DOCUMENTS 6,630,996 B2 * 10/2003 Rao et al. .................. 356/237.5
7,570,786 B2 *  8/2009 Ateya ........................... 382/103

FOREIGN PATENT DOCUMENTS

| JP | 06-028575   | 2/1994  |
| JP | 07-302343   | 11/1995 |
| JP | 2003-187335 | 7/2003  |
| JP | 2008-027200 | 2/2008  |
| JP | 2009-176209 | 8/2009  |
| JP | 2010-117331 | 5/2010  |

OTHER PUBLICATIONS

Japanese Office Action for Japanese Patent No. 2011-194055 mailed on Jul. 23, 2013.
Shotton, Jamie, et al., "Semantic Texton Forests for Image Categorization and Segmentation", IEEE, 2008.
Yanai, Keiji; "The Current State and Future Directions on Generic Object Recognition", Information Processing Society of Japan, Nov. 2007.

* cited by examiner

*Primary Examiner* — Shefali Goradia
(74) *Attorney, Agent, or Firm* — Amin, Turocy & Watson, LLP

(57) ABSTRACT

An information processing apparatus comprises a first imaging section configured to image the holding surface of a holding platform on which an object is held from different directions, a recognition section configured to, read out the characteristics of the object image of a object contained in the first imaged image based on each of the first imaged images that are respectively imaged by the first imaging section from different directions and compare the read characteristics with the pre-stored characteristics of each object, thereby recognizing the object corresponding to the object image every first imaged image and a determination section configured to determine the recognition result of the object held on the holding platform based on the recognition result of the object image every first imaged image.

5 Claims, 12 Drawing Sheets

IMAGE PROCESSING APPARATUS AND METHOD FOR OBJECT RECOGNITION

CROSS-REFERENCE TO RELATED APPLICATION

This application is based upon and claims the benefit of priority from Japanese Patent Application No. 2011-194055, filed Sep. 6, 2011, the entire contents of which are incorporated herein by reference.

FIELD

Embodiments described herein relate to an information processing apparatus and method.

BACKGROUND

Conventionally, there is known a generic object recognition technology which extracts characteristics of an object (target) from the image data of the object and compares the extracted characteristics with the reference data (characteristics) that is prepared in advance, thereby recognizing the category of the object. Moreover, there is also developed a shop system in which the generic object recognition technology is applied to recognizing the category (e.g. food) of a commodity.

BRIEF DESCRIPTION OF THE DRAWINGS

FIG. 11-1 is a diagram showing an example of a first image imaged by a first imaging section located at one side shown in FIG. 2;

FIG. 11-2 is a diagram showing an example of a first image imaged by a first imaging section located at the other side shown in FIG. 2;

FIG. 11-3 is a diagram showing an example of a first image imaged by the second imaging section shown in FIG. 2;

DETAILED DESCRIPTION

In accordance with an embodiment, an information processing apparatus comprises a first imaging section configured to image the holding surface of a holding platform on which an object is held from different directions, a recognition section configured to, readout the characteristics of the object image of a object contained in the first imaged image based on each of the first imaged images that are respectively imaged by the first imaging section from different directions and compare the read characteristics with the pre-stored characteristics of each object, thereby recognizing the object corresponding to the object image every first imaged image and a determination section configured to determine the recognition result of the object held on the holding platform based on the recognition result of the object image every first imaged image.

The information processing apparatus and method provided in this embodiment are described below with reference to accompanying drawings. Moreover, what is described in this embodiment is an example of the application of the information processing apparatus and method to a commodity registration device for recognizing and registering the commodities settled in one transaction.

Figure 1:
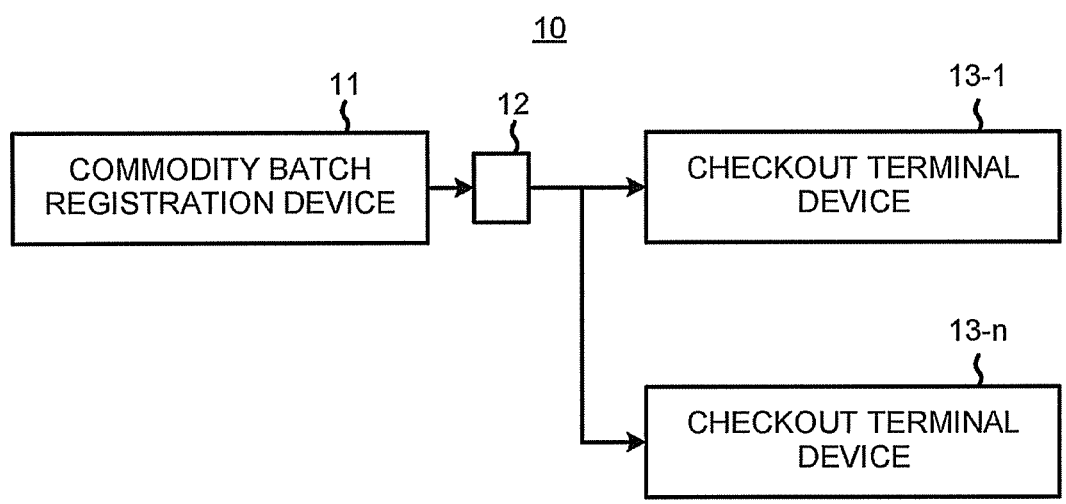
FIG. 1 is a block diagram roughly showing the components of a checkout system according to an embodiment.

FIG. 1 is a block diagram roughly showing the components of a checkout system 10 according to an embodiment. The checkout system 10 comprises: a commodity registration device 11 which is configured as an object recognition device to specify one or more commodities using an object recognition technology to register the commodities; and a plurality of checkout terminal devices (POS terminal devices) 13-1 to 13-*n* which are configured to read, accompanied with the registration, an after-mentioned commodity pre-registration sheet 12 issued by the commodity registration device 11 to carry out a checkout processing.

Figure 2:
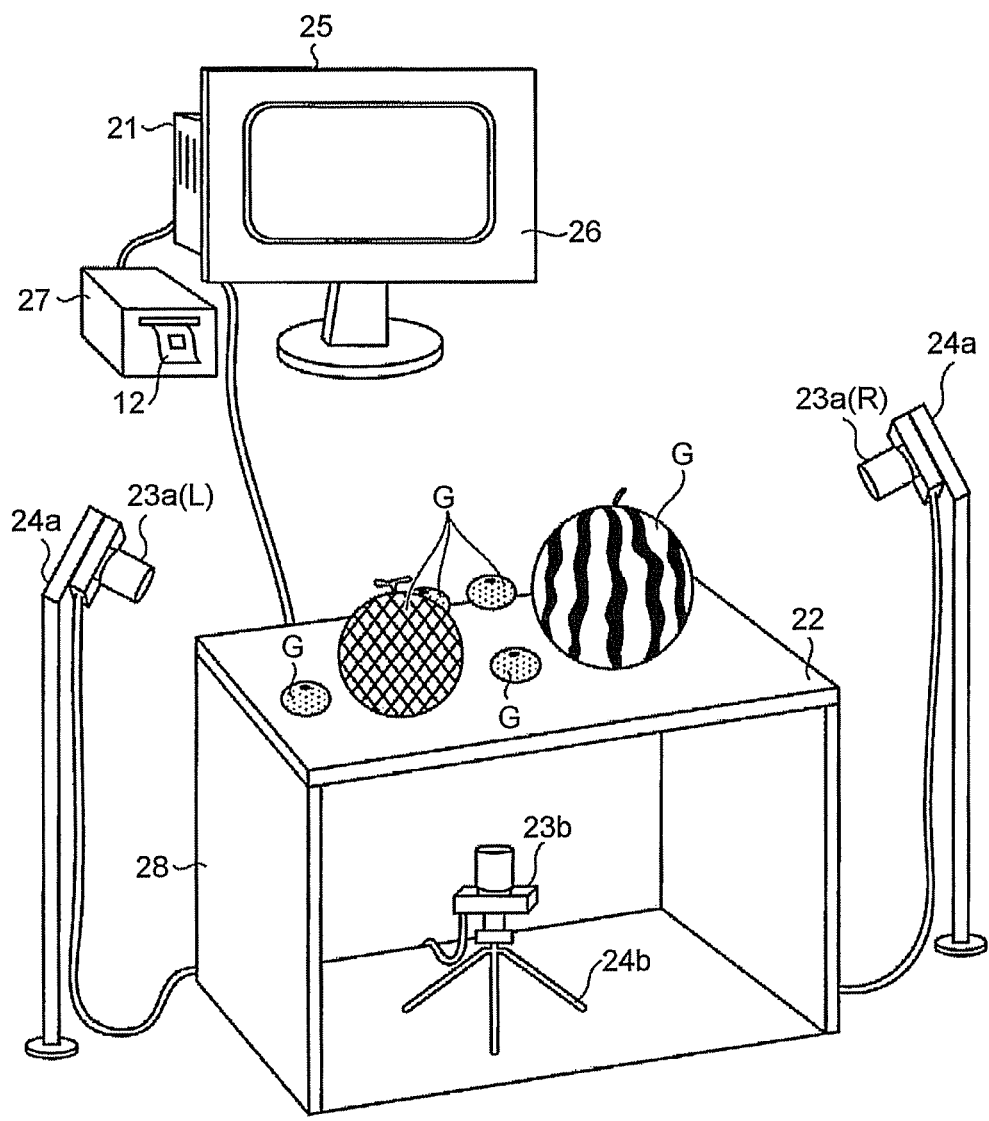
FIG. 2 is an external perspective view of a commodity registration device.

FIG. 2 is an external perspective view of the commodity registration device 11. The commodity registration device 11, which will be described in detail below, comprises: a main body 21; a holding platform 22 for holding a commodity, first imaging sections 23*a* (R, L) configured to image the holding platform 22 from the right upper side and the left upper side shown in FIG. 2; a second imaging section 23*b* configured to image the holding platform 22 from below the holding platform; a first maintaining section 24*a* configured to maintain the first imaging sections 23*a* at a given position; a second maintaining section 24*b* configured to maintain the second imaging sections 23*b* at given positions; a display 25 configured to display various kinds of information; a touch panel sensor 26 configured on the display screen of the display 25 for various operations; and a printer 27 configured to print and output the commodity pre-registration sheet 12 that will be described later. The first image sections 23*a* (R, L), if not distinguished specially, are hereinafter referred to as the first imaging section 23*a*.

The holding platform 22 is made from a light-transmitting material such as plate-shaped glass or transparent resin, thus, the commodity G held on the holding platform 22 can be imaged by the second imaging section 23*b* from below (under) the holding platform 22. Moreover, in FIG. 2, the holding platform 22 is configured on the upper surface of a box-shaped support table 28, however, the holding platform 22 is not limited to be configured in this form. Further, commodities are not held (configured) on the holding platform 22 in a given state, and preferably, the commodities are configured in a non-contact manner, that is, separated from each other by a space.

The first imaging sections 23*a* and the second imaging section 23*b* are imaging devices provided with an imaging element such as a CCD (Charge Coupled Device Image Sensor) or CMOS (Complementary Metal Oxide Semiconductor). Here, the first imaging sections 23*a* are maintained at positions from where the upper surface of the holding platform 22 can be imaged from different imaging directions, while each of or the group of the first imaging sections 23a takes the whole area of the holding platform 22 as an imaging area. The second imaging section 23b sets the whole area of the holding platform 22 as an imaging area. Moreover, the first imaging sections 23a and the second imaging section 23b are connected with the main body 21 in a wired or wireless manner.

Figure 3:
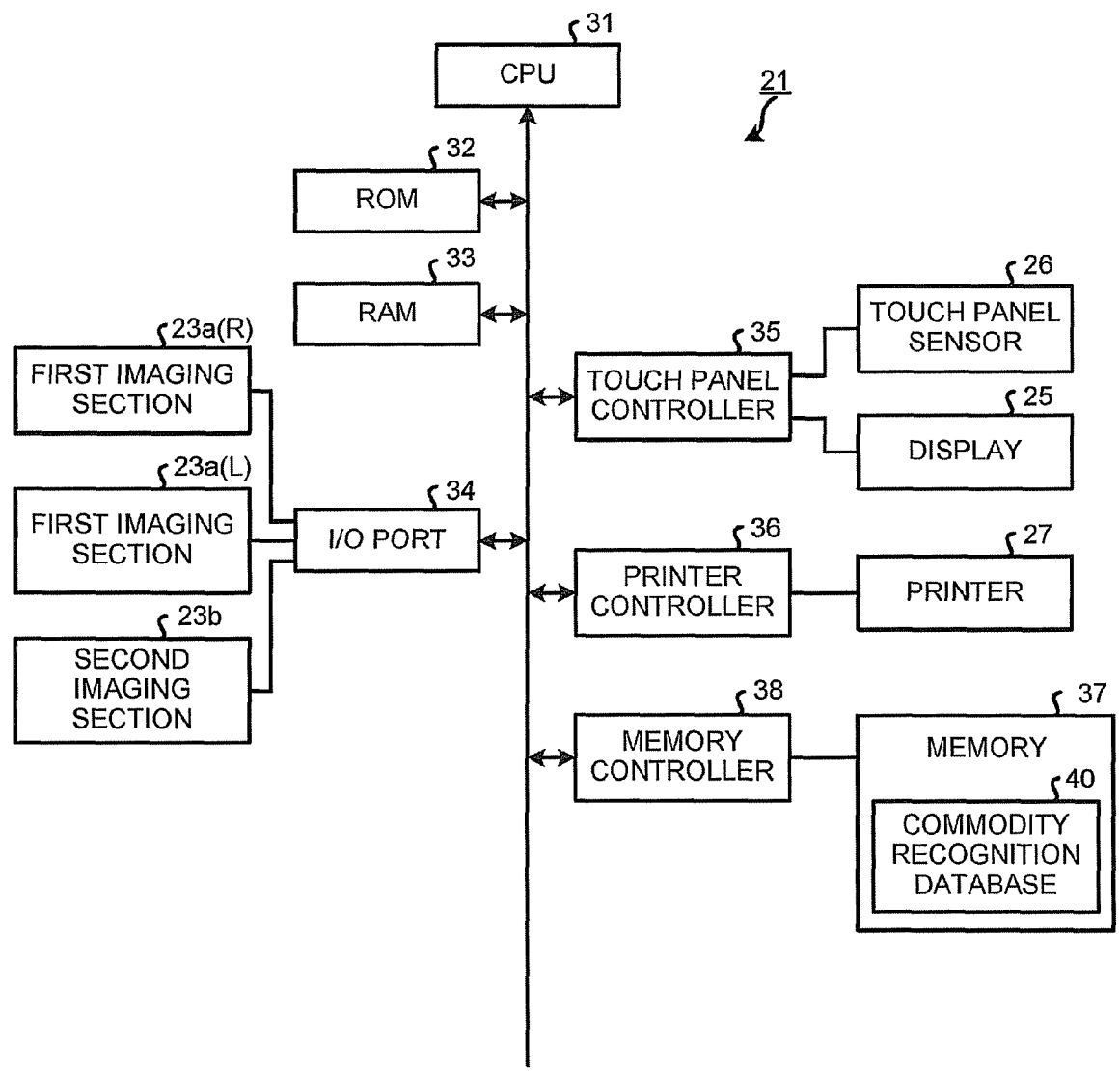
FIG. 3 is a block diagram roughly showing the components of a commodity registration device.

FIG. 3 is a block diagram roughly showing the components of the commodity registration device 11. The commodity registration device 11 comprises a CPU (Central Processing Unit) 31 for executing various operations to control each other unit; an ROM (Read Only Memory) 32 for storing control programs in a nonvolatile manner; and an RAM (Random Access Memory) 33 for storing various kinds of data temporarily to form a working area, wherein the foregoing units are connected via a bus line.

In addition, the commodity registration device 11 comprises: an I/O port 34 capable of controlling the connection between the first imaging sections 23a and the second imaging section 23b; a touch panel controller 35 for controlling the display 25 and the touch panel sensor 26 under the control of the CPU 31; a printer controller 36 for controlling the printer 27 under the control of the CPU 31; and a memory controller 38 which is configured as a hard disk drive or SSD (Solid State Drive) to control, under the control of the CPU 31, a memory 37 in which the programs executed by the CPU 31 and various large-volume data are stored in an updatable manner. In the structure above, a commodity recognition database 40 is contained in the memory 37.

Figure 4:
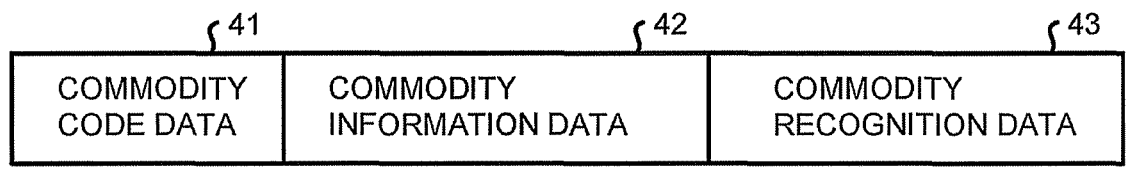
FIG. 4 is a diagram illustrating an example of the data format of a commodity recognition database.

FIG. 4 is a diagram illustrating an example of the data format of the commodity recognition database. The commodity recognition database 40 includes: commodity code data 41 for storing the commodity code that is uniquely distributed to a commodity; commodity information data 42 for storing commodity-related information such as commodity name; and commodity recognition data 43 for recognizing a commodity through an object recognition based on the characteristics extracted from an imaged image containing the commodity. Here, the commodity recognition data 43 refers to the characteristics (outline, tone, color) of a commodity, and the characteristics extracted from a commodity as reference characteristics are pre-stored as characteristic data.

Moreover, the technology for recognizing a commodity (target; object) contained in an image is explicated in detail in the following document:

ANAI Keiji, 'The current state and further directions on Generic Object Recognition', in Proceedings of Information Processing Society of Japan, Vol. 48, No SIG 16, In URL: http://mm.cs.uec.ac.jp/IPSJ-TCVIM-Yanai.pdf [retrieved on Aug. 10, 2010].

In addition, the technology for recognizing a generic object through target-aimed regional image segmentation is described in the following document:

Jamie Shotton: "Semantic Texton Forests for Image Categorization and Segmentation, In URL:http://citeseerx.ist.p-su.edu/viewdoc/
download?doi.10.1.1.145.3036&rep=repl&type=pdf
(retrieved on Aug. 10, 2010).

Figure 5:
FIG. 5 is a diagram illustrating an example of a commodity pre-registration sheet.

FIG. 5 is a diagram illustrating an example of the commodity pre-registration sheet. The commodity registration device 11 specifies the commodity held on the holding platform 22 after completing a target recognition, and then prints and outputs a commodity pre-registration sheet 12 containing the information on all the specified commodities through the printer 27.

As shown in FIG. 5, the commodity pre-registration sheet 12 comprises: a registered commodity number printing area 51 in which the number of the commodities registered is printed; a total amount printing area 52 in which the total amount of commodities is printed; a two-dimensional barcode printing area 53 in which a two-dimensional barcode containing the commodity code of a commodity is printed; and an annotation printing area 54 in which various annotations are printed.

Specifically, in the example shown in FIG. 5, it can be known that the number of the commodities registered is 6 according to the information displayed in the registered commodity number printing area 51, that the approximate total amount is 1260 yen according to the information displayed in the total amount printing area 52, and that the commodity pre-registration sheet 12 should be delivered to a cashier according to the information displayed in the annotation printing area 54.

Figure 6:
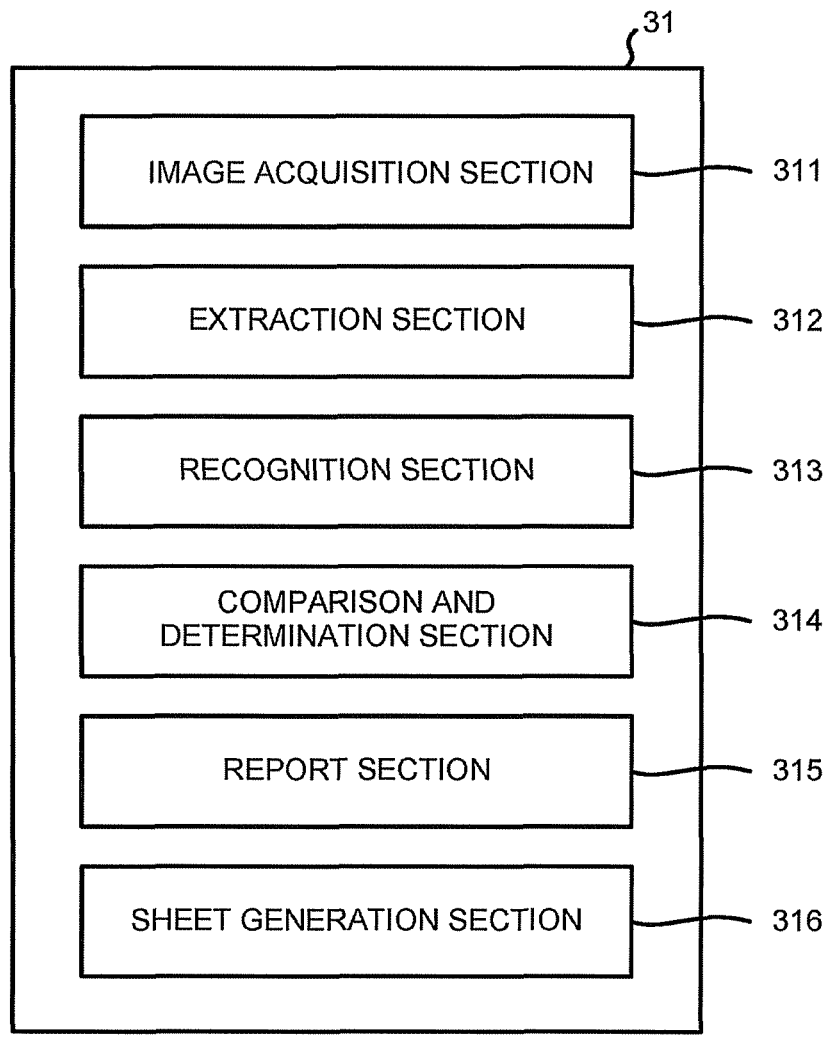
FIG. 6 is a block diagram roughly showing the functional units of a commodity registration device.

Next, the functional units of the CPU 31 achieved by the sequential program running of the CPU 31 are described below with reference to FIG. 6. FIG. 6 is a block diagram showing the functional units of the commodity registration device 11. As shown in FIG. 6, by executing programs sequentially, the CPU 31 functions as an image acquisition section 311, an extraction section 312, a recognition section 313, a comparison and determination section 314, a report section 315 and a sheet generation section 316.

The image acquisition section 311 outputs an imaging switch-on signal to the first imaging sections 23a and the second imaging section 23b to activate the first imaging sections 23a and the second imaging section 23b to carry out an imaging, acquires the images imaged by the first imaging sections 23a and the second imaging section 23b and stores the acquired images in the RAM 23. Moreover, the images imaged by the first imaging sections 23a (R, L) and the second imaging section 23b can be distinguished. The image imaged by each of the first imaging sections 23a (R, L) is hereinafter referred to as 'first image' while that imaged by the second imaging section 23b as 'second image'.

The extraction section 312 detects, using a pattern matching technology, all or part of the images of the commodities G contained each of the first and second images acquired by the image acquisition section 311. Specifically, the outlines of the commodities are detected using the first and second images, and the commodity images (object images) contained in the first and second images are extracted based on the outlines. Moreover, in the case of the extraction of object images using the second image, the outline of the image of the bottom part of each commodity G is detected, and an object image is extracted based on the outline.

The recognition section 313 reads the shape, the surface color and the distribution of the surface color of each object image (outline) extracted from each first image as characteristics, and retrieves, with reference to the commodity recognition database 40 stored in the memory 37, the commodity recognition data 43 matched with (e.g. having a high similarity with) the extracted characteristics of each object image. If the retrieval result is that there is commodity recognition data 43 the matching degree of which with the characteristics is higher than a given reference value, the recognition section 313 determines that the commodity G represented by the object image can be recognized (specified). Moreover, the recognition on the object imaged is carried out for the first image.

Further, the recognition section 313 specifies, aiming at the first image, the object image of each commodity G held on the holding platform 22 based on the position of each object image contained in the first image in the first image and the direction in which the first image is imaged. Moreover, the recognition section 313 associates the result of the recognition on each object image exported from each first image with a corresponding commodity G held on the holding platform 22, thereby determining (simplifying) the result of the recognition on each commodity G. In this way, the repeated recognition on the commodity G held at the same position of the holding platform is prevented.

Further, there is no specific limitation to the method for specifying the object image of the commodity G held at the same position of the holding platform 22, for instance, the object image of the commodity G held at the same position of the holding platform 22 may be specified using the mapping data which is formed by associating the positions of the pixels constituting the first image with the position of the object image on the holding platform 22. Further, the object image of the commodity G held at the same position of the holding platform 22 may be specified by comparing the positions of the object images of the commodity G contained in the first images.

Further, the recognition section 313 acquires the number of the commodities G of each category based on the commodities G associated with the recognition result, and acquires the total number of the commodities G of different categories as the number (total number) of all the commodities G recognized from the first image.

The comparison and determination section 314 compares the number of the object images extracted by the extraction section 312 from the second image with the number of the commodities G recognized by the recognition section 313 from the first image and, if the result of the comparison shows that the number of the object images extracted from the second image is higher than the number of the commodities G recognized from the first image, determines the existence of one or more unrecognized commodities G on the holding platform 22 and indicates a configuration change report to the report section 315.

If the result of the comparison shows that the number of the commodities G recognized from the first image is higher than the number of the object images extracted from the second image, the comparison and determination section 313 determines that the commodities G held on the holding platform 22 are all recognized. Further, the comparison and determination section 314 reads, from the commodity recognition database 40, the commodity code data 41 and the commodity information data 42 of each commodity G recognized by the recognition section 313 and outputs the read the commodity code data 41 and commodity information data 42 together with the number of the commodities G of each category acquired by the recognition section 313 and the number of the commodities G (referred hereinafter to as the number of the commodities registered) acquired by the recognition section 313 to the sheet generation section 316.

As stated above, in this embodiment, the number of the object images extracted from the second image imaged by the second imaging section 23b is processed as the number of the commodities held on the holding section 22 because the number of the commodities G of each category held on the holding platform 22 can be easily confirmed according to the undersurface (shadow) of each commodity G for the second image is obtained by imaging the commodities G from under the holding platform 22. Further, as to the confirmation easiness in the case where the number of the commodities extracted from the second image is higher than the number of the commodities G recognized from the first image, the number of the commodities acquired from the first image is sometimes more accurate, depending upon the state in which the commodities G are placed (accommodated). For instance, when the commodities G are laminated on the holding platform 22, as the commodities G are detected as undersurfaces (shadows) in the second image, the accurate number of the commodities G can be obtained according to the number of the commodities G obtained from the first images.

The report section 315 displays, on the display 25, a screen (hereinafter referred to as A configuration change indication screen) for prompting the operator to change the configuration of the commodities G held on the holding platform 22 according to the indication received from the comparison and determination section 314.

Figure 7:
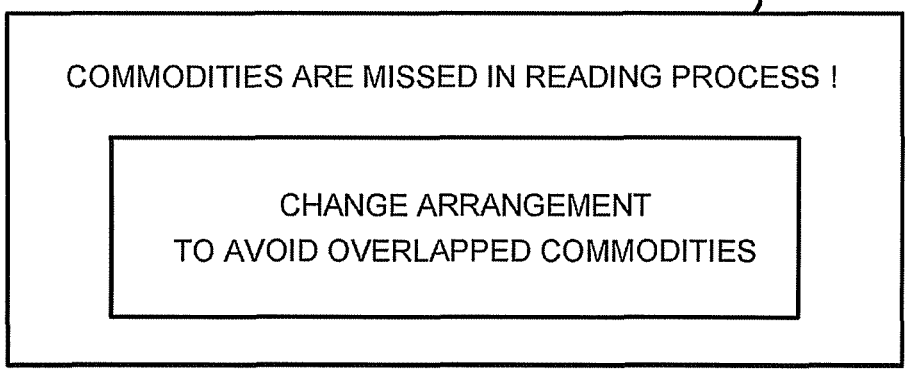
FIG. 7 is a diagram showing an example of a configuration change indication screen.

Here, FIG. 7 is a diagram showing an example of the configuration change indication screen. In FIG. 7, a change to be made in the configuration of the commodity is prompted by prompting the content that is missed in the reading process. The operator of the commodity registration device 11 changes the configuration of the commodities held on the holding platform 22 based on the configuration change indication screen displayed on the display 25. Thus, the change in the number of the commodities recognized by the recognition section 313 prevents the commodities from being missed in the reading process.

Further, in this embodiment, a change in the configuration position of a commodity is reported using the display 25, however, the present invention is not limited to this, the same change may also be reported by an output voice or an indicator light.

Return to FIG. 6, the sheet generation section 316 generates the printing data of the commodity pre-registration sheet 12 based on the commodity code data 41, the commodity information data 42, the number of the commodities G of each category and the number of the registered commodities input from the comparison and determination section 314, and instructs the printer controller 36 to print the printing data. Here, in the printer controller 36, the commodity pre-registration sheet 12 shown in FIG. 5 is output from the printer 27.

Specifically, the sheet generation section 316 configures the number of the registered commodities input from the comparison and determination section 314 in a printing area 51. Further, the sheet generation section 316 calculates the total amount of all the purchased commodities G based on the number of the commodities G of each category and the unit price of the commodities G of each category contained in the commodity information data 42, and configures the calculated amount in a total amount printing area 52. Further, the sheet generation section 316 generates a two-dimensional code using the commodity code data 41 and the commodity information data 42 and configures the two-dimensional code in a two-dimensional code printing area 53.

Figure 8:
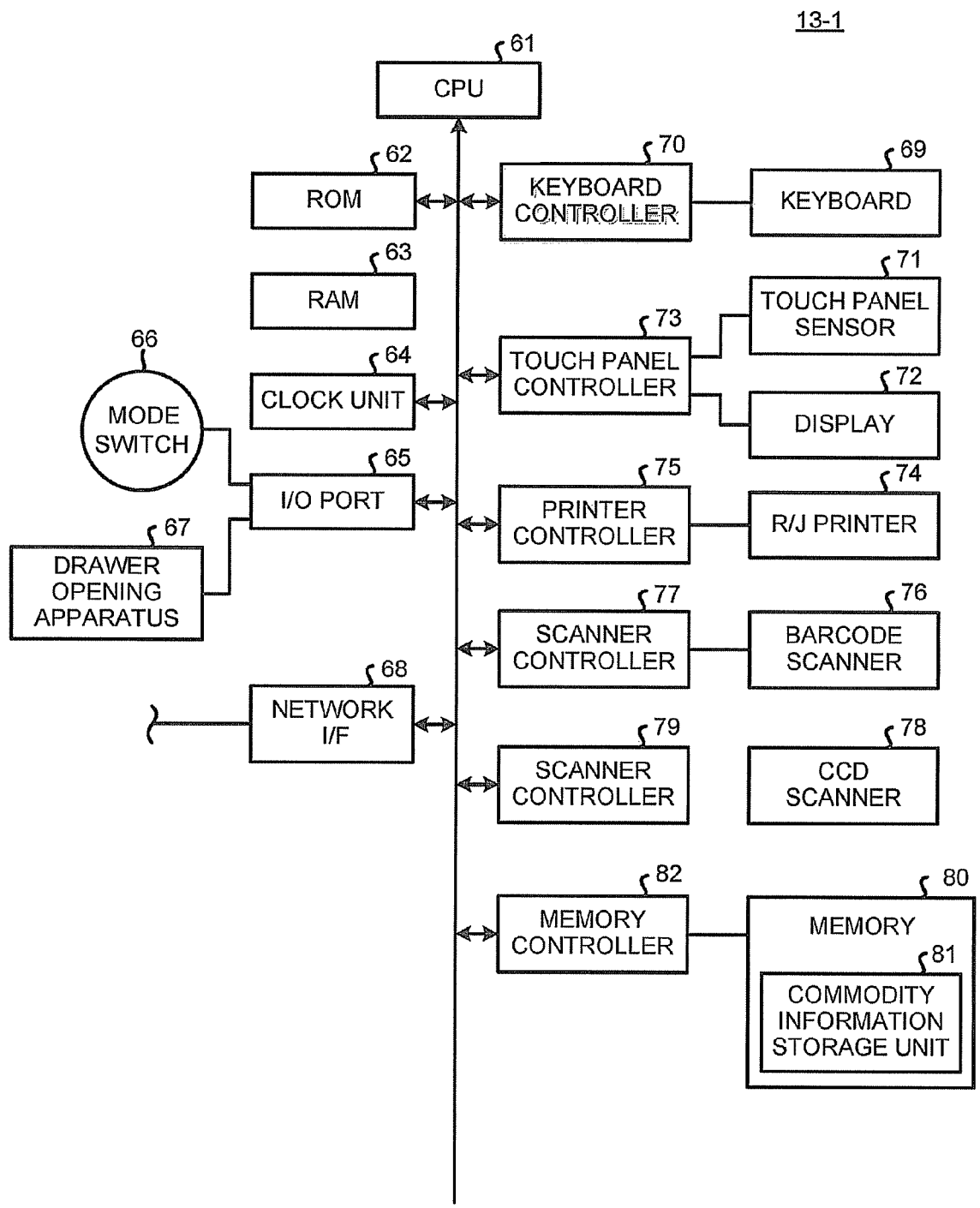
FIG. 8 is a block diagram roughly showing the components of a checkout terminal device (POS terminal device)

The checkout terminal device is described below. FIG. 8 is a block diagram roughly showing the structure of the checkout terminal device. In this embodiment, the checkout terminal devices (POS terminal devices) 13-1 to 13-n are structurally identical, so only the checkout terminal device 13-1 is illustrated as an example.

As shown in FIG. 8, the checkout terminal device 13-1 comprises: a CPU 61, an ROM 62, an RAM 63, a clock unit 64, an I/O (Input/Output) port 65, a network interface 68, a keyboard 69, a keyboard controller 70, a touch panel sensor 71, a display 72, a touch panel controller 73, a R/J (receipt/journal) printer 74 (marked as Receipt/Journal printer in FIG. 8), a printer controller 75, a barcode scanner 76, a scanner controller 77, a CCD scanner 78, a scanner controller 79, a memory 80 and a memory controller 82.

Here, the CPU 61, the ROM 62, the RAM 63, the clock unit 64, the I/O (Input/Output) port 65, the network interface 68, the keyboard controller 70, the touch panel controller 73, the printer controller 75, the scanner controller 77, the scanner controller 79 and the memory controller 82 are connected with each other via a bus lines such as an address bus line or data bus line.

The CPU 61 controls the whole checkout terminal device 13-1 by executing the various computer-readable programs stored in the ROM 62. The ROM 62 stores the various programs and data executed by the CPU 61. The RAM 63 functions as a working area to temporarily store the various programs and data executed by the CPU 61.

The clock unit 64 times the current date and time. The I/O port 65 inputs a drive signal to a cash drawer opening device 67 which receives a mode selection signal from a mode switch 66 and opens the cash drawer (not shown) automatically. The network interface 68 controls the data communication between other devices that are connected with each other via a wired communication network.

The keyboard controller 70 acquires a key signal corresponding to an operating key from the keyboard 69 and informs the CPU 61 of the acquired key signal. The touch panel controller 73 controls the drive of the display 72 additionally provided with a touch panel, displays color words corresponding to the display data provided by the CPU 61, acquires a signal from the touch panel sensor 71 arranged on the screen of the display 72, and informs the CPU 61 of the acquired signal. The printer controller 75 controls the drive of the Receipt/Journal printer 74 and prints a receipt and a journal based on the printing data provided by the CPU 61.

The barcode scanner 76 optically reads the barcode printed on a commodity. The scanner controller 77 acquires the data signal read by the barcode scanner 76 and inputs the acquired signal to the CPU 61. The CCD scanner 78 optically reads the two-dimensional barcode contained in the two-dimensional code symbol recorded in the commodity pre-registration sheet 12. The scanner controller 79 acquires the data signal read by the CCD scanner 78 and inputs the acquired signal to the CPU 61. The memory controller 82 controls the data access to the memory 80 under the control of the CPU 61.

The memory 80 consisting of, for example, a hard disc drive and an SSD, comprises a commodity information storage unit 81 for storing commodity data containing various commodity information, in addition to the programs run by the CPU 61. The commodity data stored in the commodity information storage unit 81 includes, for example, the code, the name and the unit price of a commodity.

Figure 9:
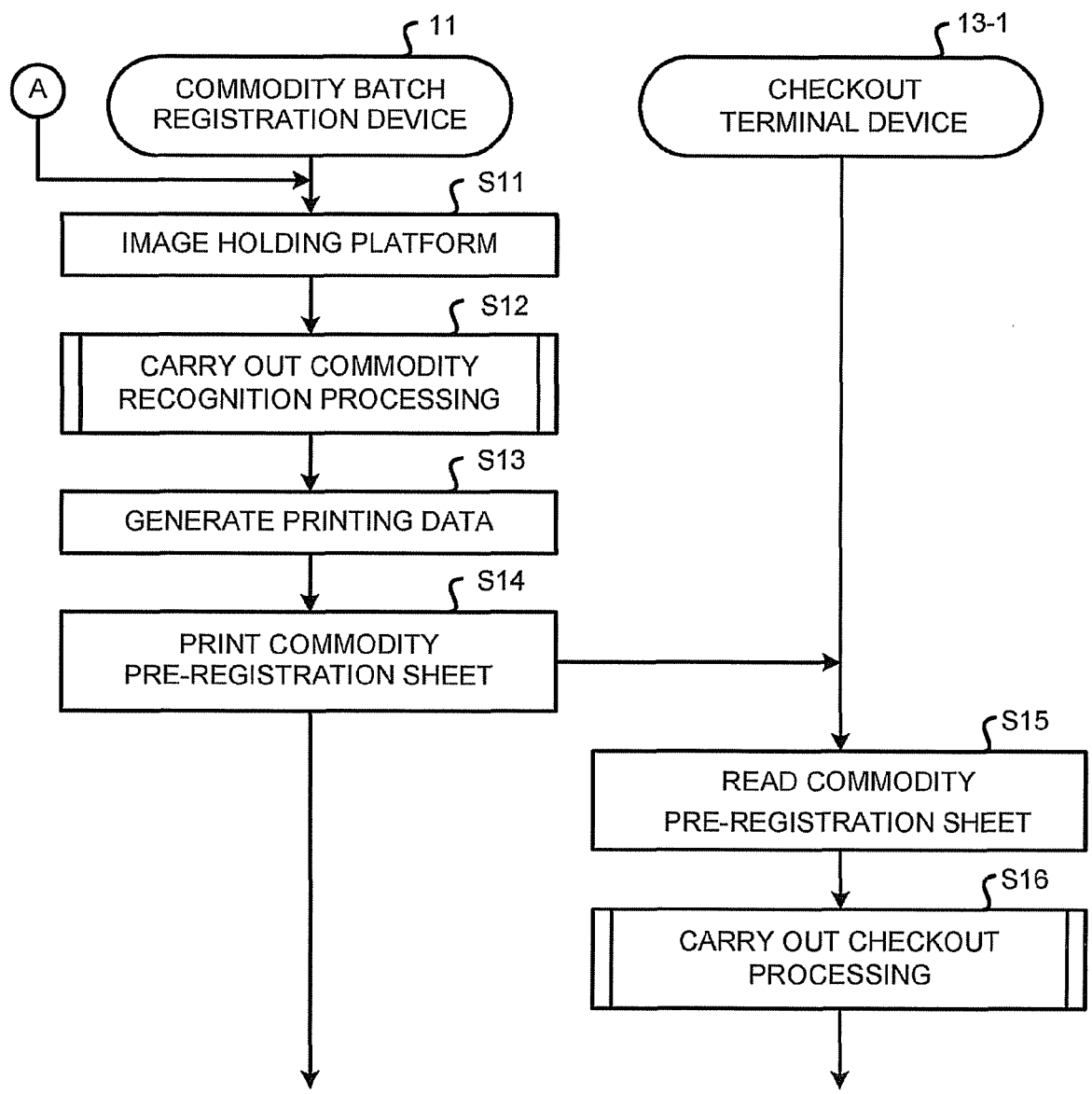
FIG. 9 is a sequence diagram showing the processing sequence of a checkout system according to an embodiment of the present invention.

Next, the actions carried out in this embodiment are described. FIG. 9 is a sequence diagram showing the processing sequence of the checkout system provided in this embodiment. First, the operator of the commodity registration device 11 places the commodities selected by a customer on the holding platform 22, as shown in FIG. 22.

Moreover, when it is automatically recognized that an imaging is prepared (for instance, it is detected that the first imaging section 23a or the second imaging section 23b images dynamically at a frequency below a given frequency), or when the operator operates the touch panel sensor 26 to input an indication, the image acquisition section 311 of the commodity registration device 11 outputs an imaging switch-on signal to the first imaging section 23a and the second imaging section 23b to activate the first imaging section 23a and the second imaging section 23b to start an imaging (Act S11). The image acquisition section 311 acquires the first images imaged by the first imaging section 23a and the second image imaged by the second imaging section 23b and stores the acquired images in the RAM 33.

Next, the extraction section 312 and the recognition section 313 of the commodity registration device 11 carry out a commodity recognition processing to recognize the commodity G held on the holding platform 22 (Act S12)

Figure 10:
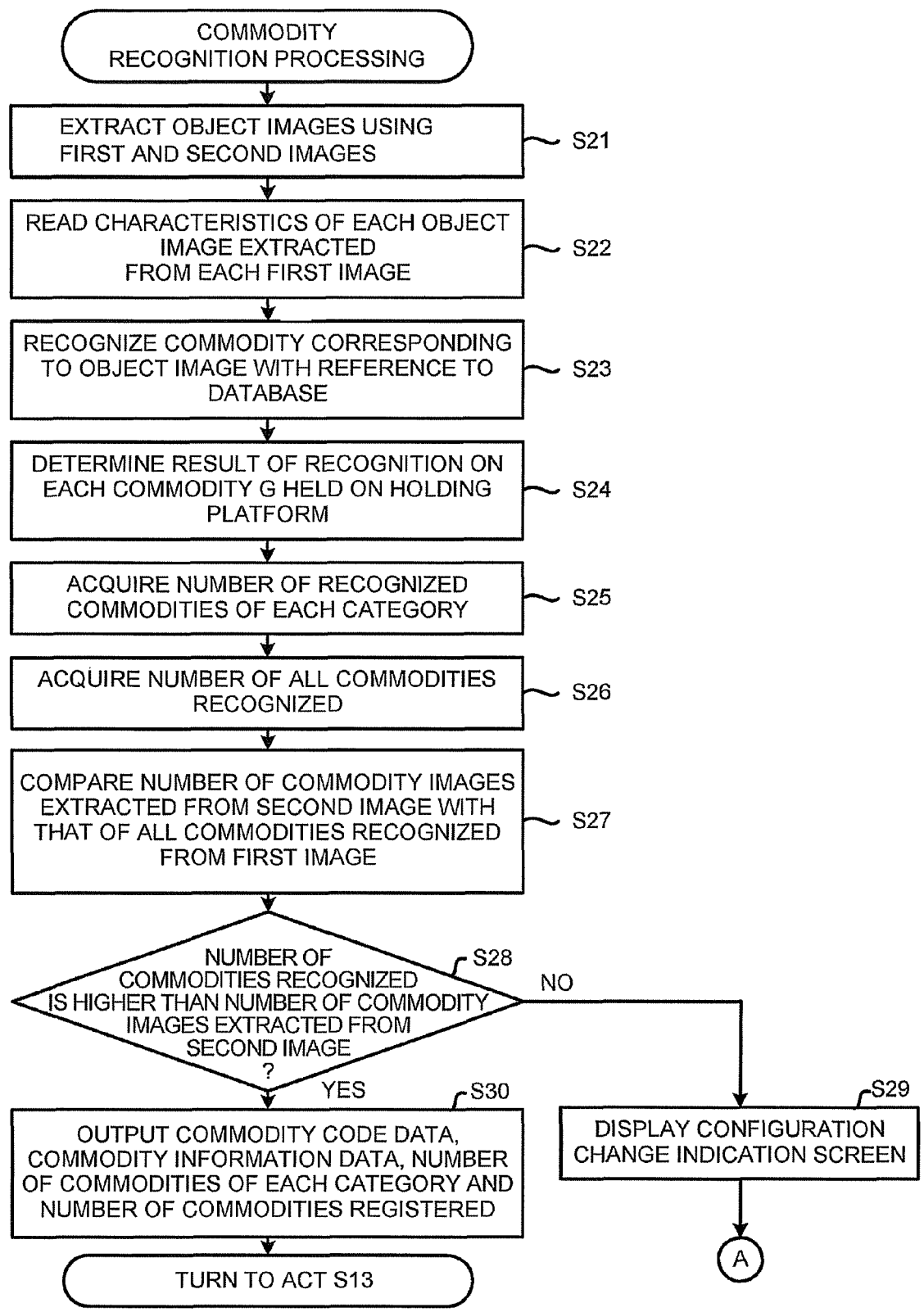
FIG. 10 is a flowchart of a commodity recognition processing.

FIG. 10 is a flowchart of the commodity recognition processing. First, the extraction section 312 detects the outlines of the commodities using the first and second images acquired by the image acquisition section 311, and then extracts the object images contained in the first and second images based on the outlines (Act S21). Then, the recognition section 313 reads the characteristics of each object image extracted aiming at each first image (Act S22).

Next, the recognition section 313 retrieves the commodity recognition data 43 matched with (e.g. having a high similarity with) the characteristics of each object image with reference to the commodity recognition database 40 stored in the memory 37. Moreover, the recognition section 313 recognizes, aiming at each object image, a corresponding commodity the matching degree of which with the characteristics is higher than a given reference value (Act S23).

Further, if there are a plurality of commodities the matching degree of which with the characteristics is higher than the given reference value, the commodities are displayed on the display 25 as commodity candidates to prompt the operator (shop assistant) to make a choose. Further, if the matching degree of each commodity with the characteristics is smaller than the given reference value, the operator is prompted to carry out a manual registration.

Sequentially, the recognition section 313 specifies the object images of the commodities G held on the holding platform based on the positions of the object images contained in each first image in the first image and the direction in which the first image is imaged and associates the recognized object image with a corresponding commodity G to determine the result of the recognition on each commodity G held on the holding platform 22 (Act S24). Further, the recognition section 313 acquires the number of the commodities G of each category based on the processing result of Act S24 (Act S25) and takes the total number of the commodities G of different categories as the number (total number) of all the commodities G recognized from the first image (Act S26).

Figures 1, 11:
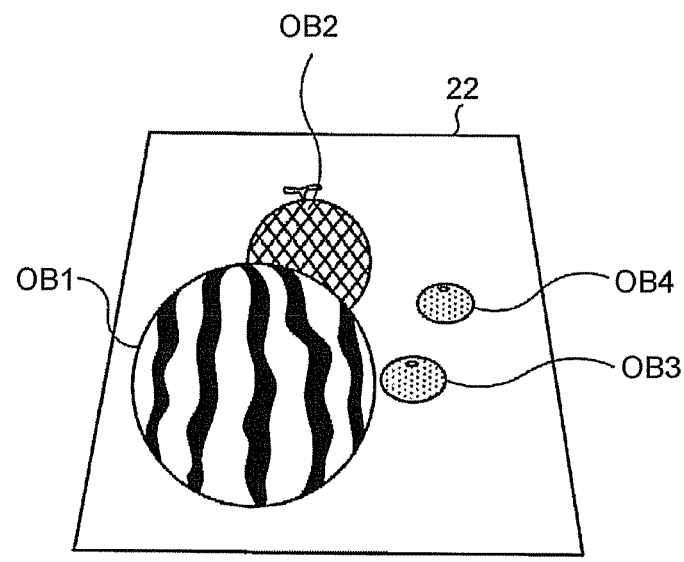
Figures 2, 11:
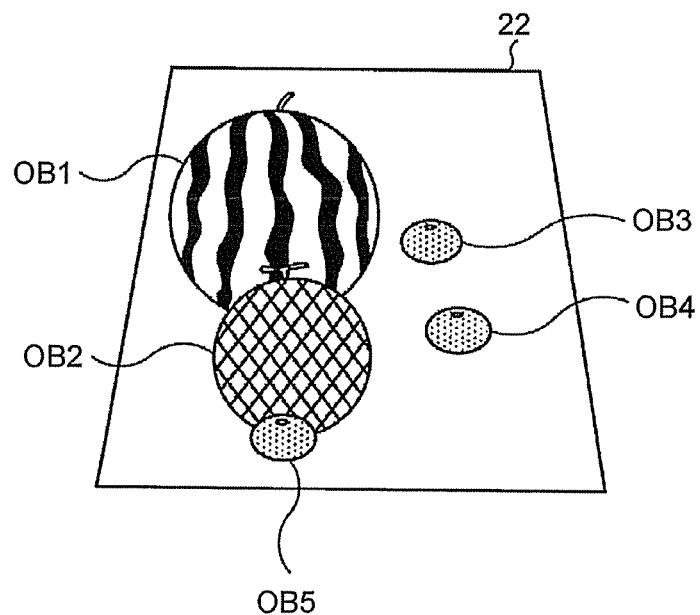
Figures 3, 11:
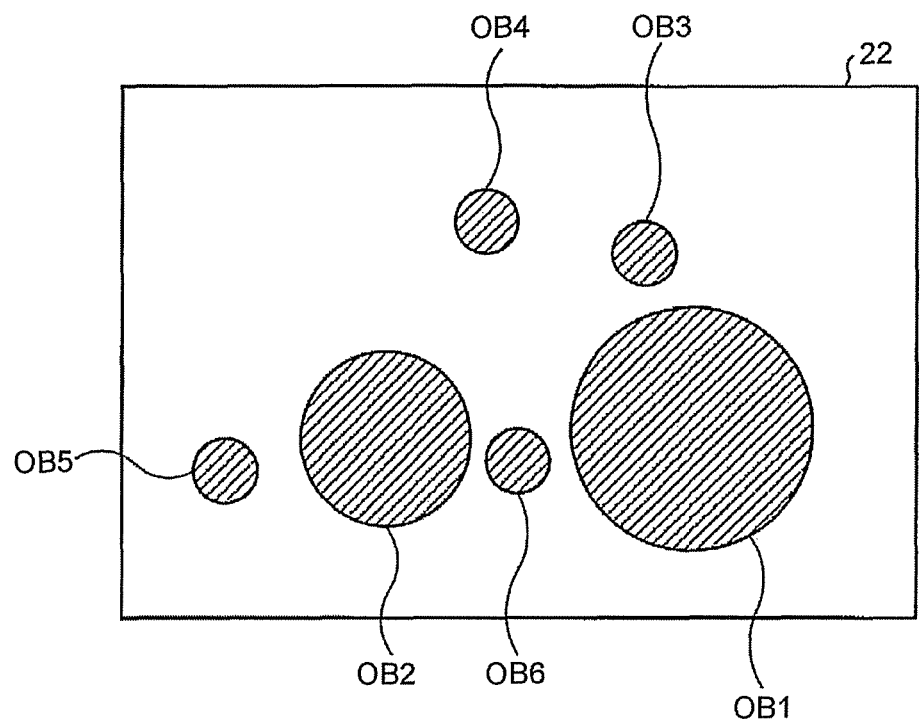

Here, FIG. 11-1 and FIG. 11-2 are diagrams showing examples of first images imaged by two first imaging sections 23a shown in FIG. 2, the two diagrams showing the same object (commodity group) held on the holding platform 22. Here, FIG. 11-3 is diagram showing an example of a first image imaged by the second imaging section 23b shown in FIG. 2, the diagram showing the same object (commodity group) with FIG. 11-1 and FIG. 11-2. Moreover, FIG. 11-1 shows a first image imaged by the first imaging section 23a (R) which images the holding platform 22 from an right upper direction, and FIG. 11-2 shows a first image imaged by the first imaging section 23a (L) which images the holding platform 22 from a left upper direction.

The extraction section 312 extracts the object images contained in FIG. 11-1, FIG. 11-2 and FIG. 11-3 in Act S21. For instance, object images OB1-OB4 are extracted from FIG. 11-1, object images OB1-OB5 are extracted from FIG. 11-2, and object images OB1-OB6 are extracted from FIG. 11-3.

The recognition section 313 reads the shape (outline), the surface color and the distribution of the surface color of each of the object images OB1-OB5 extracted from FIG. 11-1 and FIG. 11-2 as characteristics in Act S22, and then recognizes the commodities corresponding to the object images based on the characteristics in Act S23. For instance, the recognition section recognizes the object images OB1, OB2 and OB3 extracted from FIG. 11-1 and FIG. 11-2 as 'watermelon', 'muskmelon' and 'orange'.

Further, in Act S24, the recognition section 313 specifies the object images of the commodities G held on the holding platform 22 using each first image based on the position of each object image contained in the first image in the first image and the direction in which the first image is imaged, and associates the recognized object images with the commodities G. Here, in the example of FIG. 11-1 and FIG. 11-2, the result of the recognition on each of the object images OB1-OB4 recognized from each Figure are respectively associated with a corresponding G.

Further, in Acts S25 and S26, the recognition section 313 acquires the number of the commodities G of each category based on the processing result of Act S24 and takes the total number of the commodities G of different categories as the number (total number) of all the commodities G recognized from the first image. Here, the recognition section 313 recognizes one watermelon, one muskmelon and three oranges, thus, total five commodities are recognized from the first images shown in FIG. 11-1 and FIG. 11-2.

Return to FIG. 10, the comparison and determination section 314 compares the number of the object images extracted from the second image in Act S21 with the number of the commodities acquired in Act S26, that is, compares the numbers of all the commodities recognized from the first images (Act S27).

If the comparison result of Act S27 shows that the number of the object images extracted from the second image is higher than the number of the commodities G recognized from the first image (Act S28: No), the comparison and determination section 314 determines the existence of one or more unrecognized commodities G on the holding platform 22. Moreover, the comparison and determination section 314 indicates a report to the report section 315 to display a configuration change indication screen (refer to FIG. 7) on the display 25 (Act S29), and then returns to execute Act S11 shown in FIG. 9.

For instance, if the first images shown in FIG. 11-1 and FIG. 11-2 are compared with the second image shown in FIG. 11-3, then the object image OB 6 (orange) between the object images OB1 and OB2 is located at the blind imaging angle of the first imaging section 23a and therefore cannot extracted from the first image. As a result, the number (6) of the object images OB1-OB6 extracted from the second image shown in FIG. 11-3 is higher than the number (5) of the commodities G recognized from FIG. 11-1 and FIG. 11-2. In this case, the comparison and determination section 314 determines that there is an unrecognized commodity G on the holding platform 22, indicates a report to the report section 315, and displays a configuration change indication screen (refer to FIG. 7) on the display 25, thereby prompting the operator (shop assistant) that the configuration of the commodities G held on the holding platform is changed.

On the other hand, if it is determined in Act S28 that the number of the commodities G recognized from the first image is higher than the number of the object images extracted from the second image (Act S28: Yes), the comparison and determination section 313 determines that the commodities G held on the holding platform 22 are all recognized. Further, the comparison and determination section 314 reads the commodity code data 41 and the commodity information data 42 of each commodity G recognized by the recognition section 313 from the commodity recognition database 40 and outputs the read the commodity code data 41 and commodity information data 42 to the sheet generation section 316 together with the number of the commodities G of each category acquired in Act S25 and the number of the commodities G (the number of the commodities registered) acquired in Act S26 (Act S30), and then turns to execute Act S13 shown in FIG. 9.

Return to FIG. 9, if the commodity recognition processing (Act S12) is ended, then the sheet generation section 316 generates printing data of a commodity pre-registration sheet 12 based on the commodity code data 41, the commodity information data 42, the number of the commodities G of each category and the number of the registered commodities input from the comparison and determination section 314 (Act S13). Moreover, the sheet generation section 316 instructs the printer controller 36 to print the printing data, and then the commodity pre-registration sheet 12 is printed from the printer 27 (Act S14).

In this way, the customer takes the commodity pre-registration sheet 12 from the operator (shop assistant) of the commodity registration device 11 and gives the commodity pre-registration sheet 12 together with the commodities on the holding platform 22 to the operator (shop assistant) of the checkout terminal device 13-1. Then, the operator of the checkout terminal device 13-1 reads the two-dimensional barcode in the commodity pre-registration sheet 12 using the CCD scanner 78 (Act S15).

Moreover, based on the commodity code data 41 contained in the two-dimensional barcode input through the scanner controller 79, the CPU 61 of the checkout terminal device 13-1 carries out a checkout processing according to the categories and quantities of the purchased commodities, and outputs a receipt from the Receipt/Journal printer 74 (Act S16).

As stated above, in this embodiment, the object images of the commodities held on the holding platform 22 are extracted from the first images of the holding platform 22 imaged from a plurality of directions, and the commodities corresponding to the object images are recognized based on the characteristics of the object images. Thus, the commodity G at the blind imaging angle of an imaging direction can be recognized using the first image imaged in another imaging direction, thus prevents the commodity G from being missed in reading process. Further, the result of the recognition on the commodities G held on the holding platform 22 is determined based on the result of the recognition on the object images in the first image, thus preventing the commodities G held at the same position of the holding platform 2 from being recognized repeatedly and therefore improving recognition accuracy.

Moreover, the number of the commodities recognized from the first image is compared with that of the object images extracted from the second image, if the former is smaller than the latter, then it is determined that there is one or more commodities unrecognized on the holding platform 22, then a configuration change screen is displayed on the display 25 to indicate a configuration change. In this way, the operator (shop assistant) is informed of the existence of one or more commodities G configured a positions uncovered by the first image, thereby preventing a commodity from being missed in reading process.

The imaging sections of the commodity registration device 11 provided in this embodiment can be configured in various forms. For instance, two first imaging sections 23a are configured above the holding platform 22 in FIG. 2, however, the present invention is not limited to this, one first imaging section 23a may be configured with the imaging position or direction thereof changeable with respect to the holding platform 22.

Figure 12:
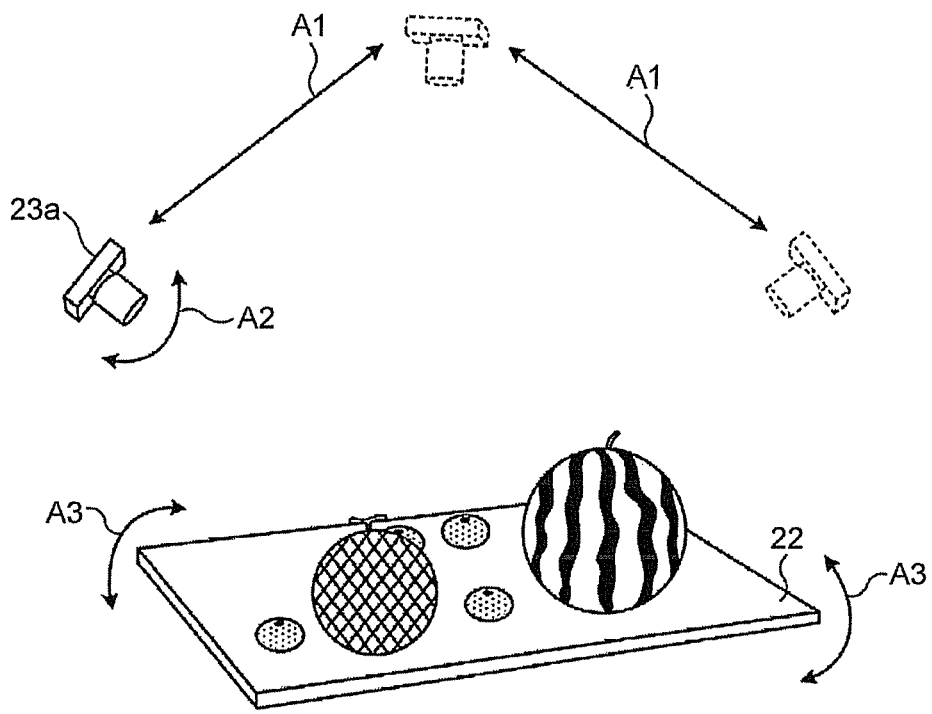
FIG. 12 is a diagram showing another structural example of a commodity registration device.

If only one first imaging section 23a is configured, for instance, as shown in FIG. 12, it is set that the configuration position (refer to the arrow A1 shown in FIG. 12) and the imaging direction (refer to the arrow A2 shown in FIG. 12) of the first imaging section 23a can be changed according to an indication from the image acquisition section 311 so as to image the upper surface of the holding platform 22 from a plurality of different imaging directions. Moreover, the first imaging section 23a may be fixed, and the holding platform 22 may be configured to be capable of moving or rotating (refer to the arrow A3 shown in FIG. 12) in a plane parallel to the holding surface of the holding platform 22 according to an instruction from the image acquisition section 311, thereby imaging the upper surface of the holding platform 22 from a plurality of different imaging directions.

Figure 13:
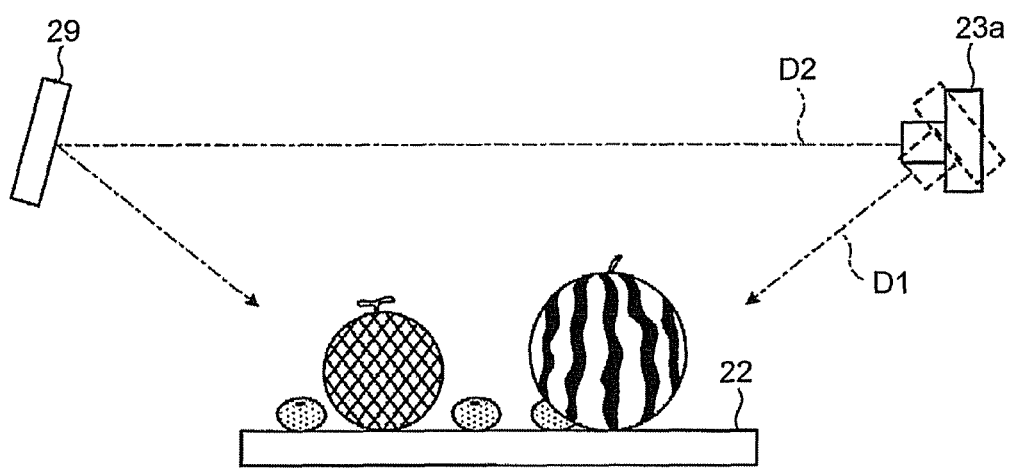
FIG. 13 is a diagram showing still another structural example of a commodity registration device.

Further, by setting one first imaging section 23a and one or a group of reflecting mirrors and changing the imaging direction of the first imaging section 23a or the reflecting angles of the reflecting mirrors, the upper surface of the holding platform 22 may also be imaged from a plurality of different imaging directions. For instance, as shown in FIG. 13, by setting one first imaging section 23a and one reflecting mirror 29 and making the imaging direction of the first imaging section 23a face directions D1 and D2, the upper surface of the holding platform 22 can be imaged from two different imaging directions. Further, the angles of the first imaging sections 23a and the reflecting mirrors 29 can be adjusted by changing the holding platform 22 to be the imaging range (shooting range).

While certain embodiments have been described, these embodiments have been presented by way of example only, and are not intended to limit the scope of the invention. Indeed, the novel embodiments may be embodied in a variety of other forms; furthermore, various omissions, substitutions and changes in the form of the embodiments may be made without departing from the spirit of the invention. The accompanying claims and their equivalents are intended to cover such forms or modifications as would fall within the scope and spirit of the invention.

For instance, in the embodiment above, the commodities G are directly held on the holding platform 22, however, the present invention is not limited to this, the commodities G may be accommodated in a light-transmitting container or a bag and then placed on the holding platform 22.

Moreover, in the embodiment above, the object to be recognized is a commodity (target), however, the present invention is not limited to this, the object to be recognized may also be the code symbol (barcode or two-dimensional code) attached to a commodity. In this case, the recognition section 313, with an additional decoding function of decoding the information contained in a code symbol, acquires the number of the code symbols decoded from a first image as the number of the recognized commodities. Moreover, in order to prevent a repeated decoding on the same code symbol, the same position on the holding platform 22 is preferably confirmed in the same way.

Further, in the embodiment above, the commodity recognition database 40 is stored in the commodity registration device 11, however, the present invention is not limited to this, the commodity recognition database 40 may also be stored in an external device accessible to the commodity registration device 11.

Further, in the embodiment above, the data connection between the commodity registration device 11 and the checkout terminal devices 13-1 to 13-n is carried out using a paper medium such as the commodity pre-registration sheet 12, however, the present invention is not limited to this, the same data exchange may also be carried out through a wireless communication connection using a wireless network such as Bluetooth (trademark), or a wired communication connection using a wired network such as an Ethernet (trademark) or an electronic record medium (recording communication medium) such as an RFID or USB.

Further, in the embodiment above, commodity code and commodity information are recorded as two-dimensional barcode in the commodity pre-registration sheet 12, however, the present invention is not limited to this, the commodity code and the commodity information may also be recorded as one or more one-dimensional barcode.

Further, the programs executed by each device mentioned in the embodiment above are pre-compiled in the storage medium (ROM or memory unit) of the device, however, the present invention is not limited to this, the programs may be stored as in a computer-readable recording medium such as CD-ROM, FD (floppy drive), CD-R, DVD (digital versatile disk) as an installable or executable file. Moreover, the storage medium, which is not limited to a medium independent from a computer or integrated system, may include a storage medium which is stored or temporarily stored by downloading the programs transmitted over an LAN or the Internet.

In addition, the programs executed by each device may be stored in a computer connected with a network such as the Internet to be provided through a network download or provided or issued by a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a first imaging section configured to image a holding platform which is made from a light-transmitting material from different directions;
a second imaging section configured to image the holding platform from below the holding platform;
a recognition section configured to, read out the characteristics of an object image of an object which is held on the holding platform based on each of the first images that are respectively imaged by the first imaging section from different directions and compare the read characteristics with pre-stored characteristics of each object, thereby recognizing the object corresponding to the object image every first image;
a determination section configured to determine a recognition result of the object held on the holding platform based on a recognition result of the object image every first image;
a comparison section configured to compare the number of the object images contained in a second image that is imaged by the second imaging section with the number of the objects that are determined by the recognition result; and
a report section configured to report according to a comparison result of the comparison section.

2. The information processing apparatus according to claim 1, wherein the report section is configured to report a configuration change in the object held on the holding platform when the comparison result of the comparison section is that the number of the object images contained in the second image is higher than the number of the objects determined by the recognition result.

3. The information processing apparatus according to claim 2, further comprising:
an output section configured to output the recognition result if the comparison result by the comparison section is that the number of the objects determined by the recognition result is higher than the number of the object images contained in the second image.

4. The information processing apparatus according to claim 1, wherein
the first imaging section includes a plurality of imaging devices configured to image from different imaging directions or an imaging device configured to be able to change imaging position or imaging direction relative to the holding platform, and an acquisition section configured to acquire the first image that is imaged by the imaging device.

5. A method, comprising:
imaging a holding platform which is made from a light-transmitting material from different directions;
imaging the holding platform from below the holding platform;
reading out the characteristics of an object image of an object which is held on the holding platform based on each of first images that are respectively imaged from different directions and comparing the read characteristics with pre-stored characteristics of each object, thereby recognizing the object corresponding to the object image every first image;
determining a recognition result of the object held on the holding platform based on a recognition result of the object image every first image;
comparing the number of the object images contained in a second image that is imaged with the number of the objects that are determined by the recognition result; and
reporting according to a comparison result of the comparing.

* * * * *